United States Patent [19]
Pond
[11] 4,004,712
[45] Jan. 25, 1977

[54] VENDING MACHINE AND MICROWAVE OVEN COMBINATION

[75] Inventor: John Francis Pond, Vineland Station, Canada
[73] Assignee: Moyer Diebel Limited, Jordan Station, Canada

[22] Filed: Oct. 21, 1975
[21] Appl. No.: 624,430
[52] U.S. Cl. .................... 221/150 A; 219/10.55 B
[51] Int. Cl.² .................... A47J 39/00
[58] Field of Search .................... 194/10, 9 T; 99/357; 219/214, 10.55 R, 10.55 B; 221/150 A, 150 HC

[56] References Cited

UNITED STATES PATENTS

| | | | |
|---|---|---|---|
| 3,155,212 | 11/1964 | Hines | 194/10 |
| 3,165,186 | 1/1965 | Zeiter | 221/150 HC |
| 3,381,605 | 5/1968 | Smith | 194/10 X |
| 3,386,550 | 6/1968 | Murray et al. | 194/10 |

*Primary Examiner*—Stanley H. Tollberg
*Attorney, Agent, or Firm*—Hirons & Rogers

[57] ABSTRACT

An electrically operated vending machine is electrically associated with a microwave oven so that use of the oven is permitted only upon the vending of a food item from the vending machine and for a specified period of time after such vending. The vending machine incorporates an electrical outlet to which the microwave oven is connected, a first relay which causes energization the outlet when an item is vended, and a second relay which energizes the outlet and maintains the energization of the oven provided that operation of the oven is commenced within a predetermined time after the vending of a purchase from the machine.

3 Claims, 2 Drawing Figures

VENDING MACHINE AND MICROWAVE OVEN COMBINATION

FIELD OF THE INVENTION

This invention is concerned with improvements in or relating to a vending machine and microwave oven combination.

REVIEW OF THE PRIOR ART

The use of vending machines for the automatic sale of various items of food is now of course a well established industry. With the advent of commercially-available, rapidly-operating ovens, such as microwave ovens, it has become possible to vend various hot food items, such as soups, stews, and sandwiches, by storing them cold in the vending machine and having the purchaser heat them in a microwave oven upon their purchase. I understand that it has been proposed hitherto to provide a vending machine with a microwave oven incorporated therein, the purchaser placing a food item requiring heating in the oven upon its delivery by the machine. Such an arrangement has the severe disadvantage that the vending machine cannot be used by a subsequent purchaser until the first purchaser has made his selection, purchased the item, and heated it in the oven, all of these steps involving a relatively long cycle.

Accordingly, the most common arrangement for an automatic vending location is simply to provide a microwave oven unit at the location which is operated completely independently of the vending machine. This does involve problems in that the oven is available for use by persons other than those who have purchased items from the vending machine, which is an undesirable business situation. A more serious problem is the possibility of damage to such ovens by the heating therein of various items, such as for example a foil-wrapped sandwich, which can cause destruction of the microwave producing element of the oven.

In one prior art system known to me each item vended which requires heating has included therein a key or token, which key or token is then used by the purchaser to operate the microwave oven for the required period of time. This also is not a satisfactory solution, since it means that each vended item must include such a token, the microwave oven must be provided with a token-receiving mechanism, and the handling, sorting and recovery of the tokens involves an additional labour intensive operation, which adds considerably to the cost.

DEFINITION OF THE INVENTION

It is an object of the present invention to provide a new vending machine adapted for use with a separate microwave oven and able to control the operation of such an oven.

It is a more specific object of the invention to provide a new vending machine adapted for use with a separate microwave oven, which will only permit use of the oven upon the vending of a suitable item of food from the vending machine for a specified period of time after such vending.

In accordance with the present invention there is provided an electrically operated food vending machine and microwave oven combination comprising:

an inlet to the vending machine for electrical power;

an outlet from the vending machine for electrical power to operate an associated microwave oven plugged into the outlet and having its own independent cooking timing control;

a first relay in the vending machine operable upon vending of an item by the vending machine to permit energisation of the said outlet for energisation of the oven;

a timer in the vending machine which is actuated to commence a timing period upon vending of an item by the machine and which controls the first relay to time the period during which it can permit energisation of the outlet; and a second relay in the vending machine permitting the energisation of the said outlet and maintaining the said energisation of the microwave oven independently of the oven cooking timing control provided operation of the microwave oven is commenced under the control of its oven cooking timing control within a predetermined period set by the timer after the vending of a purchase from the machine.

DESCRIPTION OF THE DRAWING

A particular preferred embodiment of the invention will now be described, by way of example, with reference to the accompanying diagrammatic drawings, wherein.

DESCRIPTION OF THE PREFERRED EMBODIMENT

Figure 1:
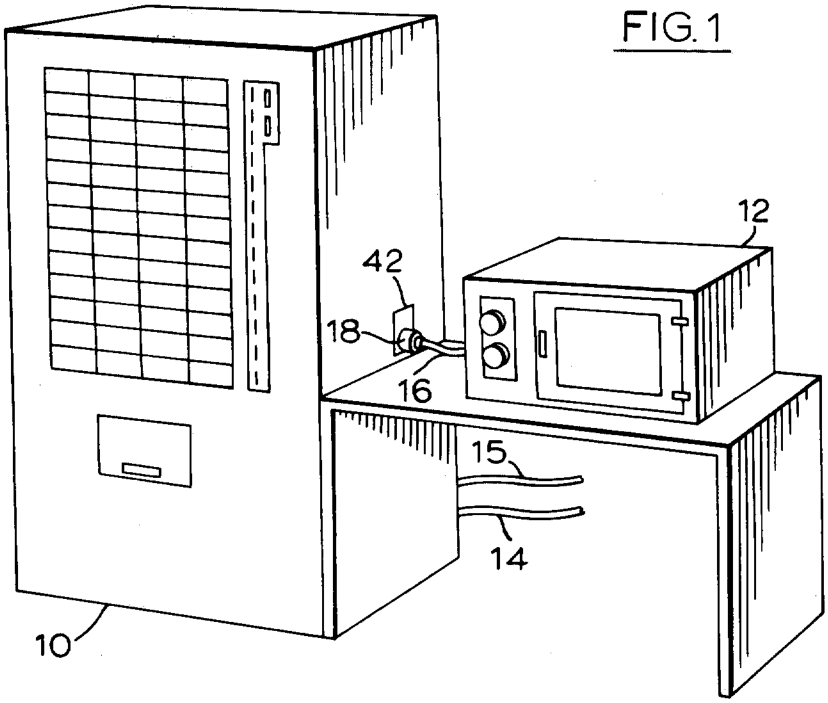
FIG. 1 is a diagrammatic perspective view showing the vending machine and the microwave oven.
Figure 2:
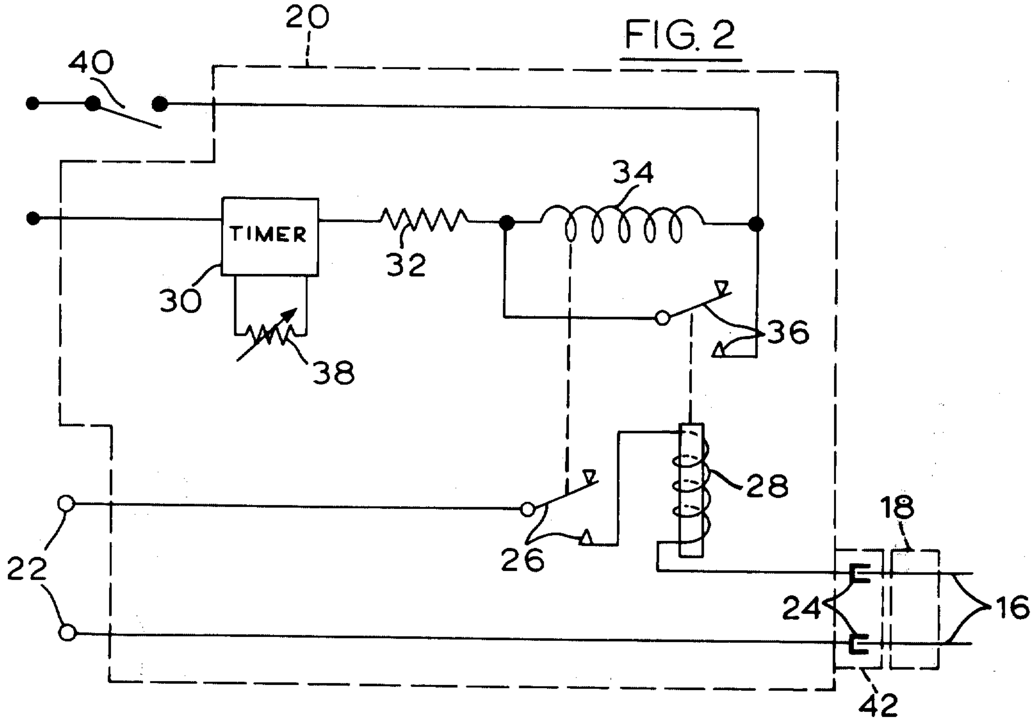
FIG. 2 is a circuit diagram of the vending machine circuit employed for controlling the microwave oven.

In the arrangement shown in the drawing a vending machine is indicated by the general reference 10, while a microwave oven is indicated by the general reference 12. The power supplied to the vending machine for its own operation is by means of a power cord 14, while the heavier power required for operation of the oven is supplied via another cord 15, since many codes require the use of a special heavy current plug, both cords being connected into the body of the machine in accordance with the local electrical code. The microwave oven is of any suitable commercial type having its own independent cooking timing control and is supplied with power via a cord 16, which also is connected into the body of the vending machine in accordance with the local electrical code, and has a plug 18 which is plugged into a control unit 20. The circuit of the control unit is shown in FIG. 2.

The control unit has two terminals 22 which are supplied with the electrical power for operating the oven from the cord 15, these terminals being connected to terminals 24, which connect with the plug 18, via normally open contacts 26 and relay winding 28.

Another portion of the control unit includes a timer 30 having normally closed contacts, a protective load resistor 32 and a relay coil 34, this coil controlling the operation of contacts 26. The relay coil 28 in turn controls the operation of normally open contacts 36 which, when closed, shunt out the relay coil 34. The period for which the timer is operative to open the circuit through it is controlled by a variable resistor 38.

In stand-by mode the contacts 26 and 36 are open and the oven cannot be supplied with current. Upon the machine 10 vending an article the contacts 40 are opened momentarily, causing the timer to begin operating, whereupon it opens the circuit through the first relay 34, thus closing the contacts 26 and permitting the supply of operating current to the oven. If the oven is now operated by the purchaser, then the oven supply current passing through the second relay 28 causes closure of the contacts 36 shunting the first relay 34, so that the latter cannot again become energised until the supply of current to the oven has ceased. With the first relay 34 shunted the resistor 32 limits the current to the timer to a safe value.

Typically the timer 30 is set to close its contacts again between about 2 to 5 minutes after the contacts 40 have opened, giving the purchaser ample time to begin to use the oven. However, if use of the oven does not begin within this time period, then with the contacts 36 open operating current is again supplied to the relay 34 and the contacts 26 open preventing operation of the oven; in these circumstances use of the oven can only be obtained by making another purchase.

As long as use of the oven has commenced within the alloted period, then it will remain in operation for as long as operating current is drawn through the relay 28, as determined by the cooking timing control of the oven itself. However, as soon as the oven completes the cycle set by its own control and current ceases to flow the contacts 36 open, then the contacts 26 open, disconnecting the oven until another purchase is made.

It will be apparent to those skilled in the art that the relay 28 need not be controlled directly by the oven operating current but could be controlled via another relay that is in turn controlled by the oven operating current. The first described embodiment has the advantage that a minimum number of components is required and the oven is simply plugged into a socket 42 in a wall of the vending machine.

I claim:

1. An electrically-operated food vending machine and microwave oven combination comprising:

an inlet to the vending machine for electrical power;

an outlet from the vending machine for electrical power to operate an associated microwave oven electrically connected to the outlet and having its own cooking and timing control;

a first relay in the vending machine operable upon vending of an item by the vending machine to permit energisation of the said outlet for energisation of the oven;

a timer in the vending machine which is actuated to commence a timing period upon vending of an item by the machine and which controls the first relay to time the period during which it can permit energisation of the outlet; and a second relay in the vending machine permitting the energisation of the said outlet and maintaining the said energisation of the microwave oven independently of the oven cooking timing control provided operation of the microwave oven is commenced under the control of its oven cooking timing control within a predetermined period set by the timer after the vending of a purchase from the machine.

2. A machine as claimed in claim 1 wherein the said first relay has normally-open contacts which are closed to supply electrical power to the said outlet to operate the oven, and the timer is in series with the first relay, operation of the timer for the predetermined period deenergising the relay and thereby closing its normally open contacts.

3. A machine as claimed in claim 2, wherein the second relay has normally open contacts which when closed shunt the said first relay to deenergise the first relay, so that its normally open contacts remain closed while electrical power is supplied to the oven, the second relay being deenergised upon cessation of supply of electrical current to the oven to thereby open the shunting contacts and permit the first relay to open its contacts.

* * * * *